United States Patent [19]
Nagano

[11] Patent Number: 5,134,598
[45] Date of Patent: Jul. 28, 1992

[54] DISK PLAYER WITH PEAK LEVEL DETECTION DURING HIGH-SPEED PLAYBACK

[75] Inventor: Shuichi Nagano, Kanagawa, Japan

[73] Assignee: Sony Corporation, Tokyo, Japan

[21] Appl. No.: 561,737

[22] Filed: Aug. 1, 1990

[30] Foreign Application Priority Data

Aug. 18, 1989 [JP] Japan ................................. 1-212515

[51] Int. Cl.⁵ ............................................. G11B 7/00
[52] U.S. Cl. ........................................ 369/32; 369/50; 369/58; 358/342
[58] Field of Search ..................... 369/54, 58, 48, 47, 369/32, 50, 59, 124, 44.32; 358/342; 360/15

[56] References Cited

U.S. PATENT DOCUMENTS

| | | | |
|---|---|---|---|
| 4,646,280 | 2/1987 | Toyosawa | 369/50 |
| 4,796,247 | 1/1989 | Vogelsang | 369/44.32 |
| 4,964,109 | 10/1990 | Yoshioka | 369/51 |
| 5,008,872 | 4/1991 | Tomoda et al. | 369/50 |

Primary Examiner—Roy N. Envall, Jr.
Assistant Examiner—Thang V. Tran
Attorney, Agent, or Firm—Lewis H. Eslinger; Jay H. Maioli

[57] ABSTRACT

A disk player includes a disk reproducing unit having a normal reproducing mode in which a disk on which digital audio signals are recorded is reproduced in a normal mode at the timing of normal reproducing clocks and a high speed reproducing mode in which the disk is reproduced in a high speed mode at the timing of high speed reproducing clocks having a frequency higher than the frequency of the normal reproducing clocks, and a peak level detection unit for integrating the digital audio signals obtained upon reproducing the disk by the disk reproducing unit operated at the high reproducing speed, at each predetermined time period, comparing the integrated values for the time periods to find a maximum integration value and outputting the maximum integration value as the peak level.

12 Claims, 3 Drawing Sheets

DISK PLAYER WITH PEAK LEVEL DETECTION DURING HIGH-SPEED PLAYBACK

BACKGROUND OF THE INVENTION

1. Field of the Invention

This invention relates to a disk player, such as a CD player for reproducing a compact disk (CD) on which digital audio signals are recorded previously. More particularly, it relates to such disk player having the function of detecting the maximum signal level of the digital audio signals recorded on the disk to be reproduced, and a method for detecting the peak signal level.

2. Related Art Statement

In a so-called compact disk CD, on which digital audio signals are recorded, the inner peripheral side of a helical recording track serves as the playback start end, while the outermost peripheral side of the track serves as the playback terminal end. With the usual continuous playback operation, signal reproduction is performed from the center towards the outer periphery of the disk. The program information, recorded on the CD, takes the form of a set of plural program data sections each corresponding to a musical number, and is recorded along with the address information. On the inner peripheral side of the helical recording track, there are recorded data indicating, for example, the number of recorded program data sections or the time required for reproducing the recorded program data sections from the playback start end until the playback terminal end, that is the total playback time, as the table of contents data or TOC data.

In reproducing the CD on which address data are recorded along with the plural program data sections, the playback address data may be utilized to reproduce the CD at a desired position in the program data, that is, to selectively reproduce certain desired program data sections.

Thus, in addition to the usual operational modes for continuous reproduction for sequentially reproducing the plural program data sections recorded on the CD, various other operational modes for reproduction, such as the operational mode for reproducing the program data in an arbitrarily set playing sequence, or the operational mode for reproducing the program data in a random sequence (shuffle mode), are provided in some of the CD players.

These program data reproducing functions of the CD player are utilized for, for example, a dubbing operation in which the record contents of plural disks are selected arbitrarily, the playback sequence is set on a program and the record contents on the disks are selectively reproduced so as to be recorded and edited on the magnetic tape.

On the other hand, with the tape recorder employing a magnetic tape as a recording medium, the signal level of the analog audio signals to be recorded is indicated by level detection/display means, such as peak level meter, and the optimum recording level is set by the user on the basis of the display contents by the level detection display means to effect recording with lesser distortion. The above mentioned optimum recording level is usually set to the maximum signal level of the analog audio signals to be recorded.

Meanwhile, in a disk player for reproducing a digital audio disk, such as a compact disk CD on which digital audio signals are recorded previously the audio data reproduced from the digital audio disk are monitored by, for example, a microcomputer, for detecting the maximum playback output level. However, the digital audio signals recorded on the digital audio disk are the digital data sampled at a sampling frequency high enough to satisfy the Nyguist condition and having a wide dynamic range. For example, in the case of a compact disk (CD), the digital audio signal is the 16-bit digital data having a sampling frequency of 4.1 kHz. For this reason, if the maximum value of the audio data reproduced from the digital audio signals recorded on the digital audio disk is detected directly, an instantaneous peak value, that is, the sound that cannot be sensed by the listener's ears or the instantaneous peak value that cannot be detected or displayed by level detection display means provided in the tape recorder is detected. On the other hand, if the peak value is detected while the audio data are reproduced at a normal playback speed from the digital audio signals recorded on the digital audio disk, the total playback time of the disk would be necessitated for peak detection.

In a disk player in which the digital audio disk, such as a compact disk CD on which the digital audio signals are recorded previously, the maximum playback output level, that is, the data peak value, can be detected by monitoring the audio data reproduced from the digital audio disk by, for example, a microcomputer. However, if the digital audio signals are reproduced at a normal playback speed, the total playback time at the normal reproducing mode of the disk is necessitated to effect the peak detection.

If the total playback time is necessitated for peak detection under the normal playback mode for setting the optimum recording level in the tape recorder, the peak detection efficiency is affected adversely.

On the other hand, in a disk player for reproducing a digital audio disk, such as a compact disk, on which the digital audio signals are recorded previously, the audio data reproduced from the digital audio disk may be monitored such as with a micro-computer, for detecting the maximum playback output level, that is the data peak level. However, if the maximum value of the reproduced audio data of the digital audio signals recorded on the digital audio disk is detected directly, an instantaneous peak value, that is, the sound that cannot be sensed by the listener's ears, or an instantaneous peak value that cannot be detected and displayed by level detection/display means provided in the tape recorder, is detected. If the audio signal in the vicinity of the thus detected peak value is reproduced for setting the recording level for the tape recorder, the recording level cannot be set to an optimum level.

OBJECTS AND SUMMARY OF THE INVENTION

It is therefore a principal object of the present invention to provide a disk player in which, when the audio signals reproduced from a digital audio disk are recorded in a tape recorder, the optimum recording level can be set efficiently in a shorter time. With the disk player of the present invention, the peak value of the audio signals reproduced &rom the digital audio signals may be detected promptly.

It is a second object of the present invention to provide a method for setting an optimum recording level for tape editing by detecting the peak value of the reproduced audio data of the digital audio signals recorded on the digital audio disk. The method of the present invention may be used efficiently for setting the optimum recording level.

For accomplishing the above principal object of the present invention, there is provided a disk player comprising normal playback disk reproducing means having a normal playback function for performing a normal playback operation at the timing of normal reproducing clocks and a high speed playback function for performing a high speed playback function at the timing of high speed reproducing clocks having a frequency higher than the frequency of said normal reproducing clocks, and maximum playback output level detecting means for detecting the maximum playback output level of digital audio signals obtained upon reproducing a disk having said digital audio signals recorded thereon by said disk reproducing, means under the high speed playback mode.

For accomplishing the above second object of the present invention, there is provided a method for detecting the peak value of the digital audio signals comprising integrating digital audio data at each predetermined integrating time period, comparing the integration values for the integrating time periods to find the maximum integration value, and storing the detected maximum integration value as the peak information.

The disk reproducing means of the disk player of the present invention reproduces and outputs, from the digital audio disk, the audio data timed to the normal reproducing clocks under the normal reproducing mode in accordance with the normal playback function, while reproducing and outputting, from the same digital audio disk, the audio data timed to the high-speed reproducing clocks having a frequency higher than the frequency of the normal reproducing clocks under the high speed reproducing mode in accordance with the high speed playback function. The maximum playback output level detection means detects the maximum playback output level of the audio data reproduced for the digital audio disk by the high speed reproducing operation of the disk reproducing means. In accordance with the method of the present invention for detecting the peak of the digital audio signals, digital audio data are integrated at each predetermined integration time period. The values of integration for the integration time periods are compared to one another to find the maximum value of integration which is then stored as the peak information.

In accordance with the above described disk player, of the present invention, the maximum playback output of the reproduced audio data from the digital audio disk is detected by the maximum playback output detection means, while the disk reproducing means are operated under the high speed reproducing mode, so that the data peak value may be detected in a shorter time. Thus the optimum recording level may be set efficiently in a shorter time when recording the audio signal reproduced from the digital audio disk disk on the tape recorder.

In accordance with the method of the present invention for detecting the peak value of the digital audio signals, the digital audio data are integrated at an interval of a predetermined integrated time period, and the maximum value of integration which is obtained at the period in which the mean level for the period becomes maximum is stored as the peak information, so that peak detection may be achieved in a manner to adequately cope with the auditory sense of the human ears or the level meter response characteristics of the tape recorder. In other words, the sound that cannot be perceived by the listener's ears or an instantaneous peak value that cannot be detected for display by level detection/display means of the tape recorder or the like may not be sensed as the peak value.

Thus, with the use of the peak information obtained by the method of the present invention for detecting the peak value of the digital audio signals, the optimum recording level can be set accurately during, for example, tape editing.

DETAILED DESCRIPTION OF PREFERRED EMBODIMENT

A preferred embodiment of the present invention will be hereinafter explained by referring to the accompanying drawings.

Figure 1:
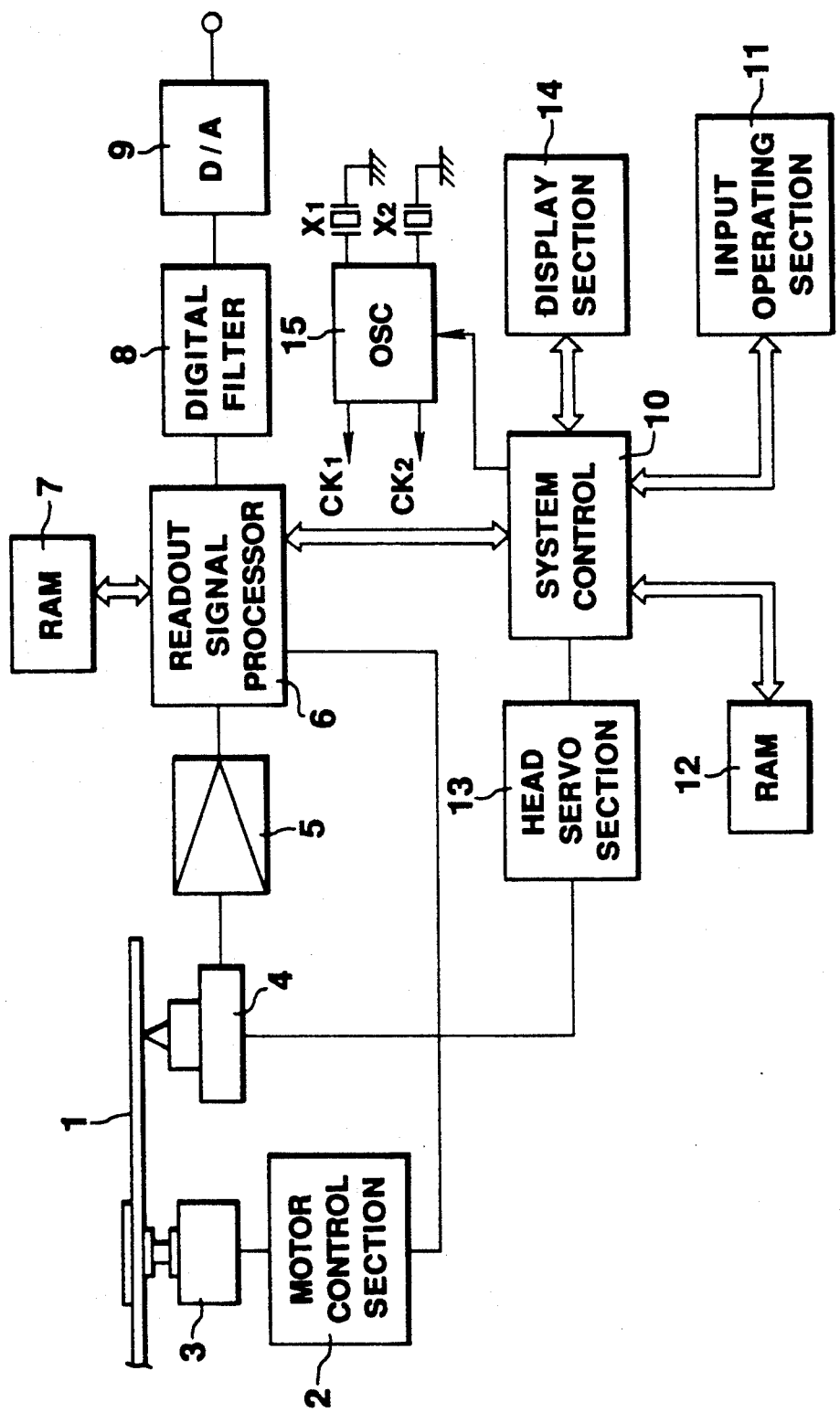
FIG. 1 is a block diagram showing an arrangement of a typical disk player according to the present invention.

FIG. 1 shows an arrangement of a typical disk player according to the present invention.

The disk player shown in FIG. 1 is an optical disk player adapted for reproducing the information from a compact disk player 1.

The compact disk 1 is rotationally driven by a spindle motor 3 which is controlled in its operation by a motor control unit 2. The information recorded on the compact disk 1 is read optionally by an optical head 4 operating as information reading means.

The optical head 4 causes a light beam from, for example, a laser light source, not shown, to be irradiated on the compact disk 1, while the beam is converged by an objective lens, not shown, on a signal recording surface of the compact disk. The compact disk 1 also detects the light beam by a photodetector, not shown, in which the light beam has been modulated in accordance with the information recorded on the compact disk 1 and reflected by the compact disk, for generating information readout signals. The optical head 4 also has enclosed therein focusing controlling means for moving the objective lens in the focusing direction in a controlled manner for maintaining the light beam incident on the compact disk 1 in the correctly converged state, and tracking controlling means for causing the light beam incident on the compact disk 1 to correctly follow the recording track on the compact disk 1. Feed means, not shown, are provided within the main body of the disk player to cause the optical head in its entirety to be moved radially in relation to the compact disk 1.

The information readout signals, obtained at the optical head 4, are supplied to a readout signal processor 6 by way of a reproducing amplifier 5.

The readout signal processor 6 reproduces TOC(Table Of Contents) data indicating the record contents of the compact disk 1, total reproducing time or the like, play data, address data or the like from the information readout signals. This readout signal processor 6 is constituted by a digital signal processing circuit for reproducing the above mentioned various data from the lnformatlon readout signals by digital signal processing. The data necessary for digital signal processing in the readout signal processor 6 are stored in a random access memory 7.

The play data reproduced in the readout signal processor 6 are processed by a digital filter 8 and thence supplied to a digital-to-analog converter 9. The digital-to-analog converter 9 causes the play data to be converted into analog signals and outputs the converted analog signals as playback audio signals.

The TOC data and the address data reproduced by the readout signal processor 6 are supplied to a system controller 10.

To the system controller 10 are connected an input operating section 11 for presetting an operating mode for the disk player and a non-volatile random access memory 12 having a battery as a backup power source. The system controller 10 controls the operation of the readout signal processor 6, digital filter 8, a head servo section 13 or a display section 14 on the basis of the above mentioned TOC data or address data under the operational mode preset at the input operating section.

The disk player of the present embodiment is provided with a clock generator 15 adapted for selectively outputting reproducing clocks CK1, CK2 having different frequencies under selective control by the system controller 10. When the normal reproducing mode is set by the system controller 10, the clock generator 15 generates normal reproducing clocks CK1 for reproducing the compact disk 1 at the normal reproducing speed by a first crystal oscillator X1. When the high-speed reproducing mode is set by the system controller 10, the clock generator 15 generates high-speed reproducing clocks CK2 having a frequency twice the frequency of the normal reproducing clocks CK1 by a second crystal oscillator X2 for reproducing the compact disk 1 at a reproducing speed twice the normal reproducing speed.

When the normal reproducing mode is set by the system controller 10, the disk player performs a normal reproducing operation at the timing of the normal reproducing clocks CK1 supplied by the clock generator 15. When the high speed reproducing mode is set by the system controller 10, the disk player performs a high speed reproducing operation at the timing of the high speed reproducing clocks CK2 supplied by the clock generator 15.

With the high speed reproducing mode, play data are reproduced at a speed twice the reproducing speed for the normal playback audio data under the normal reproducing mode.

Figure 2:
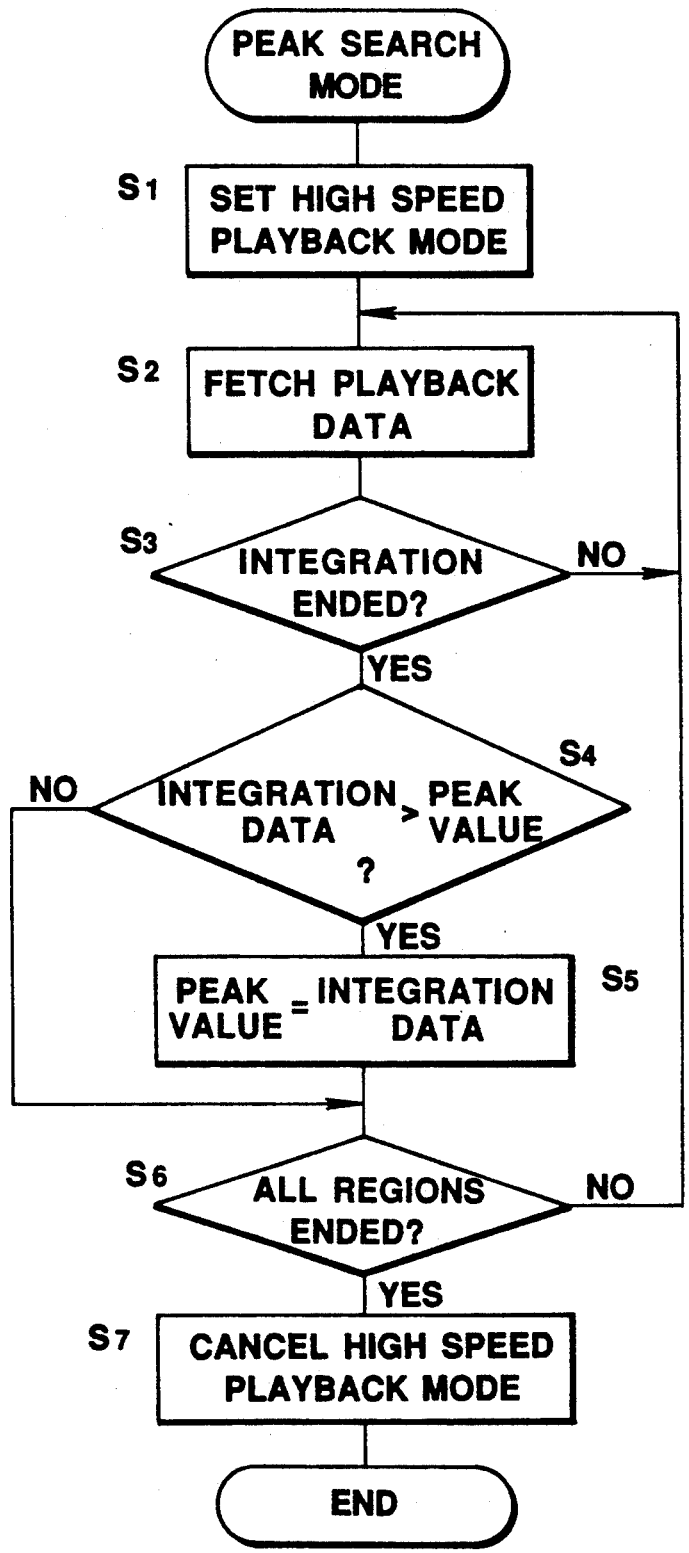
FIG. 2 is a flow chart showing a search mode control operation by a system controller in the disk player shown in FIG. 1.

Upon accepting a peak search mode setting input, as a result of the actuation of the input operating section 11, the system controller 10 functions as maximum playback output level detection means performing a peak search mode control operation in a sequence as shown in the flow chart of FIG. 2.

That is, upon accepting, as a result of operation of the input operating section 11, the peak search mode setting input, the system controller 10 enters into the peak search mode, and sets a high speed playback mode at first step S1 to start the high speed playback operation.

At the next second step S2, the play data reproduced by the readout signal processor 6 from the compact disk 1 order the high speed reproducing mode are sampled and fetched to the RAM where they are subjected to an integrating operation.

At the next third step S3, it is determined if the integrating operation at the second step S2 has been performed over a predetermined integrating time interval 1. If the result of decision at the third step S3 is NO, that is the integrating operation over the predetermined integrating time is not terminated, the program reverts to the second step S2 to repeat the integrating operation. If the result of decision at the third step S3 is YES, that is if the integrating operation over the predetermined integrating time is terminated, the program proceeds to the next fourth step S4.

At the fourth step S4, it is determined if the value of integration of the play data over the predetermined integrating time, obtained by the repetition of the operations at the second and third steps S2 and S3, is larger than the peak value up to the current time point. If the result of decision at the fourth step S4 is NO, that is if the value of integration of the play data over the above mentioned predetermined integration time is not larger than the peak value at the current time, the program proceeds to the next sixth step S6 which will be explained subsequently. If the result of decision at the fourth step S4 is YES, that is if the value of integrtion of the play data over the predetermined integration time 1 is larger than the peak value at the current time point, the program proceeds to the next fifth step S5.

At the fifth step S5, the value of integration of the play data over the above mentioned predetermined time T is stored, as a new peak value up to the current time point along with the address data of the play data at which the value of integration has been obtained, in the above mentioned random access memory 12.

At the next step S6, it is determined if the peak value detecting operation from the second step S2 to the fifth step S5 has been performed for all of the program regions on the compact disk 1. If the result of decision at the sixth step S6 is NO, that is the peak value detecting operation has not been terminated for all of the program regions the program reverts to the second step S2 to perform the peak value detecting operation for a new program region. If the result of decision at the sixth step S6 is YES, that is if the peak value detecting operation has been terminated for all of the program regions, the program proceeds to the next seventh step S7.

At the seventh step S7, the program cancels the high-speed playback mode set at the first step S1 to terminate the peak search mode control operation.

Figure 3:
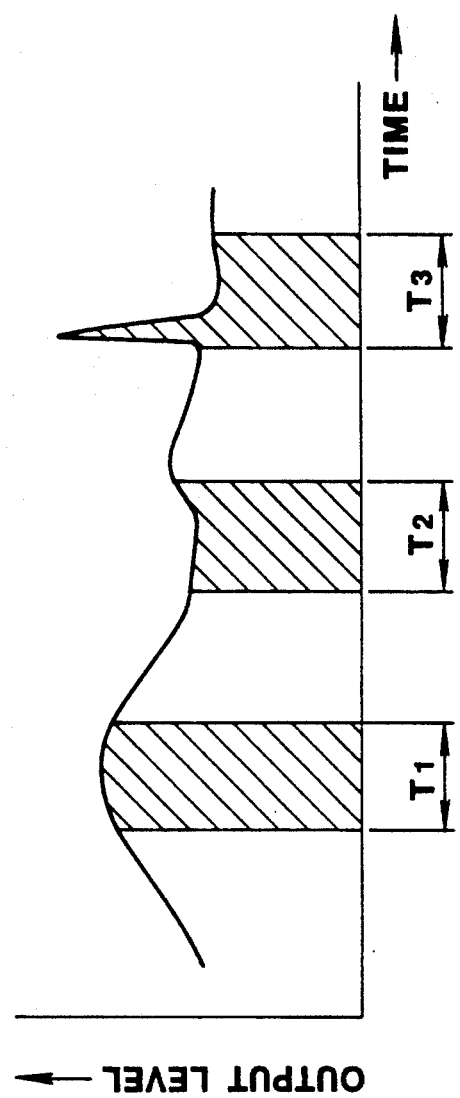
FIG. 3 is an audio signal waveform diagram for illustrating the search mode control operation by the system controller shown in FIG. 1.

With the above described disk player, when the above described peak search mode control operation is performed by the system controller 10, the processing operation at the second and third steps S2 and S3 for the play program recorded on the compact disk 1 loaded on the disk player, that is, digital audio signals corresponding to the audio signals shown in FIG. 3, is repeatedly performed at the system controller 10 to find an integrated value for each of the integrating time intervals T1, T2, T3, ... shown with hatching in FIG. 3. The integration values thus found are compared with one another at the fourth step S4 to find &he time period T1 among the time periods T1, T2, T3, ... corresponding to the maximum integration value, that is the maximum mean signal level.

It will be noted that, although an instantaneous peak level higher than the maximum level during the integrating time period T1 exists within the integrating time interval T3, such instantaneous peak level is not noticed on account of the presence of the attack time or the recovery time proper to the auditory sense of the human ear or to response characteristics of the level meter of a tape recorder. Hence, by detecting the time period T1 with the maximum mean signal level as the peak, it becomes possible to detect the proper peak best adapted to the auditory sense of the human ear or to the level meter response characteristics.

Meanwhile, on termination of the above described peak search mode control operation, the system controller 10 performs, on the basis of the above mentioned peak information stored in the RAM 12, the control operation of automatically reproducing the vicinity of the play data for which the maximum integration value has been obtained as a result of the peak search mode control operation. This allows the user to set the recording level promptly.

Also with the above described disk player, the peak search mode control operation by the system controller 10 is performed with the high speed reproducing mode set at the first step S1, so that the peak detecting operation may be accomplished in a shorter time. In addition, with the above described disk player, since the play data reproduced from the compact disk 1 by the readout signal processor 6 under the high speed reproducing mode are sampled at the second step S2 for performing a peak detection, the time required for peak detection may be shortened additionally.

What is claimed is:

1. A disk player comprising:
   a clock generator means for outputting reproducing clocks at normal frequency and at high speed frequency;
   disk reproducing means for reproducing digital audio signals having a plurality of successive fixed length time periods recorded on a disk at a speed determined in and said reproducing means having a normal playback mode for performing a normal playback operation at a timing of said normal producing clocks and a high speed playback mode for performing a high speed playback operation at a timing of said high speed reproducing clocks having a frequency higher than the frequency of said normal reproducing clocks, and
   maximum playback output level detecting means for detecting the maximum playback output level at a plurality of successive fixed length time periods in the digital audio signals reproduced by said disk reproduced means under the high speed playback mode, so that optimum recording level can be set efficiently in a short when recording the audio signal from the disk.

2. The disk player according to claim 1 wherein said disk reproducing means comprises control means for controlling said clock generating means for generating said normal reproducing clocks in said normal playback mode or said high speed reproducing clocks in said high speed reproducing mode.

3. The disk player according to claim 2 wherein a disk playback speed of said disk reproducing means during said high speed playback operation is at least twice a disk playback speed during said normal playback operation.

4. The disk player according to claim 1 wherein said maximum playback output level detecting means comprises integrating means for integrating the digital audio signals reproduced by said disk reproducing means at each predetermined integrating time period and comparing means for comparing the values of integration for the integrating time periods to find the maximum integration value which is used as the maximum playback output level.

5. The disk player according to claim 1 wherein said maximum playback output level detecting means comprises storing means for storing the detected maximum value as a maximum playback output level.

6. The disk player according to claim 5 wherein said storing means stores said detected maximum value as the maximum playback output level, said storing means also storing the address information of the digital audio signals detected as the maximum playback output level.

7. The disk player according to claim 1 wherein said disk reproducing means automatically reproduces a portion of said disk at which said maximum playback output level is obtained and a near-by portion after termination of said high-speed playback operation based on said address information stored in said storing means.

8. A method for detecting a peak value in digital audio signals having a plurality of time periods of fixed length reproduced from a recording medium having digital audio signals recorded thereon comprising the steps of:
   integrating a plurality of time periods of fixed length of the digital audio signal at each of a plurality of predetermined integrating time periods; comparing the integrated values for the integrating time periods; and finding the maximum integrated value from the comparison of integrated values, which then is used as the peak information.

9. The method according to claim 8 further comprising the steps of accepting a peak search mode setting input, and simultaneously starting a high-speed playback operation of said digital audio signals from said recording medium.

10. The method according to claim 9 including the step of performing the reproducing operation during the peak search mode at a higher speed than the reproducing speed for the normal playback operation for said recording medium by said reproducing means.

11. The method according to claim 8 including the step of storing the detected maximum integrated value as the peak information.

12. The method according to claim 11 including the step of storing the address information of the digital audio signal at which said maximum integration value has been obtained along with said maximum integrated value.

* * * * *